United States Patent
Kobayashi et al.

(10) Patent No.: US 10,677,086 B2
(45) Date of Patent: Jun. 9, 2020

(54) VARIABLE DISPLACEMENT SUPERCHARGER

(71) Applicant: IHI Corporation, Koto-ku (JP)

(72) Inventors: Takahiro Kobayashi, Koto-ku (JP); Kenji Bunno, Koto-ku (JP); Takao Asakawa, Koto-ku (JP); Ryota Sakisaka, Koto-ku (JP); Kazuko Takeuchi, Koto-ku (JP)

(73) Assignee: IHI Corporation, Koto-ku (JP)

( * ) Notice: Subject to any disclaimer, the term of this patent is extended or adjusted under 35 U.S.C. 154(b) by 365 days.

(21) Appl. No.: 15/551,802

(22) PCT Filed: Mar. 29, 2016

(86) PCT No.: PCT/JP2016/060237
§ 371 (c)(1),
(2) Date: Aug. 17, 2017

(87) PCT Pub. No.: WO2016/159004
PCT Pub. Date: Oct. 6, 2016

(65) Prior Publication Data
US 2018/0030848 A1 Feb. 1, 2018

(30) Foreign Application Priority Data
Mar. 31, 2015 (JP) .................. 2015-071481

(51) Int. Cl.
*F01D 17/14* (2006.01)
*F02B 37/24* (2006.01)
(Continued)

(52) U.S. Cl.
CPC .......... *F01D 17/146* (2013.01); *F01D 11/005* (2013.01); *F01D 17/165* (2013.01);
(Continued)

(58) Field of Classification Search
CPC .... F01D 17/146; F01D 17/165; F01D 11/005; F16J 15/0887; F16J 15/0806; F05D 2220/40
See application file for complete search history.

(56) References Cited

U.S. PATENT DOCUMENTS 6,371,722 B1    4/2002  Takahashi
7,559,199 B2 *  7/2009  Sausse .................. F01D 17/165
                                                            415/159

(Continued)

FOREIGN PATENT DOCUMENTS

CN    101779018 A    7/2010
EP    2 837 791 A1   2/2015
(Continued)

OTHER PUBLICATIONS

International Search Report dated May 31, 2016 in PCT/JP2016/060237.

*Primary Examiner* — Brian P Wolcott
(74) *Attorney, Agent, or Firm* — Oblon, McClelland, Maier & Neustadt, L.L.P.

(57) ABSTRACT

A variable displacement supercharger includes a turbine having: a turbine housing that forms a scroll flow passage disposed around a turbine impeller; a variable nozzle unit that includes a second nozzle ring that faces the scroll flow passage and forms a part of an inner wall of the scroll flow passage; and an annular seal member that seals the gap between the turbine housing and the second nozzle ring. The seal member has a disc spring structure that is inserted into the gap and biases the turbine housing and the second nozzle ring in an axial direction of rotation, and is arranged further inside than the scroll flow passage in the radial direction of the turbine impeller.

3 Claims, 7 Drawing Sheets

(51) Int. Cl.
  *F16J 15/08* (2006.01)
  *F01D 17/16* (2006.01)
  *F01D 11/00* (2006.01)

(52) U.S. Cl.
  CPC .............. *F02B 37/24* (2013.01); *F16J 15/08* (2013.01); *F16J 15/0806* (2013.01); *F16J 15/0887* (2013.01); *F05D 2220/40* (2013.01); *Y02T 10/144* (2013.01)

(56) References Cited

U.S. PATENT DOCUMENTS

| | | | |
|---|---|---|---|
| 8,485,779 B2 * | 7/2013 | Matsuyama | F01D 17/165 415/164 |
| 8,568,092 B2 * | 10/2013 | Matsuyama | F01D 11/005 415/173.3 |
| 8,915,704 B2 * | 12/2014 | Severin | F01D 17/165 415/164 |
| 9,353,637 B2 * | 5/2016 | Gerard | F01D 11/00 |
| 10,253,683 B2 * | 4/2019 | Musil | F01D 25/24 |
| 2003/0107188 A1 * | 6/2003 | Spence | F16J 15/0887 277/644 |
| 2006/0188368 A1 | 8/2006 | Jinnai et al. | |
| 2008/0304957 A1 * | 12/2008 | Walter | F01D 17/141 415/159 |
| 2010/0247296 A1 | 9/2010 | Matsuyama | |
| 2011/0182722 A1 | 7/2011 | Matsuyama | |
| 2014/0241858 A1 | 8/2014 | Tashiro et al. | |
| 2014/0341761 A1 | 11/2014 | Severin et al. | |

FOREIGN PATENT DOCUMENTS

| | | |
|---|---|---|
| JP | 11-229886 A | 8/1999 |
| JP | 2000-265845 A | 9/2000 |
| JP | 2006-220053 A | 8/2006 |
| JP | 2009-47027 A | 3/2009 |
| JP | 2009-144545 A | 7/2009 |
| JP | 2009-281295 A | 12/2009 |
| JP | 2010-112195 A | 5/2010 |
| JP | 2010-190092 A | 9/2010 |
| JP | 2011-17326 A | 1/2011 |
| JP | 2013-68153 A | 4/2013 |
| JP | 2013-104413 A | 5/2013 |
| JP | 2014-1639 A | 1/2014 |

* cited by examiner

Fig.6
(a)
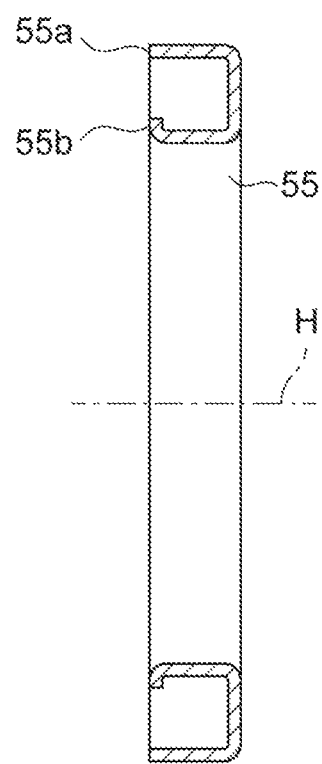
(b)
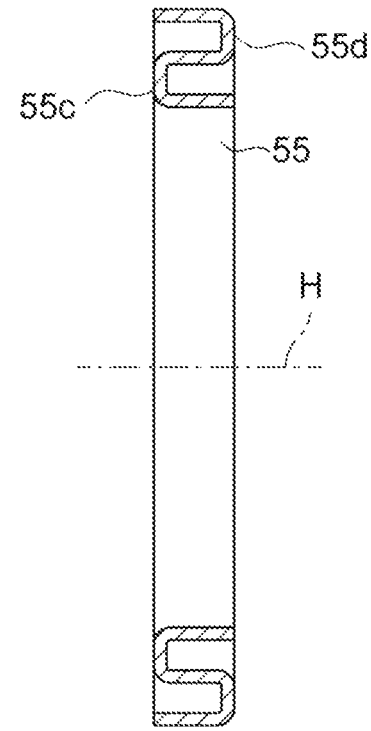
(c)
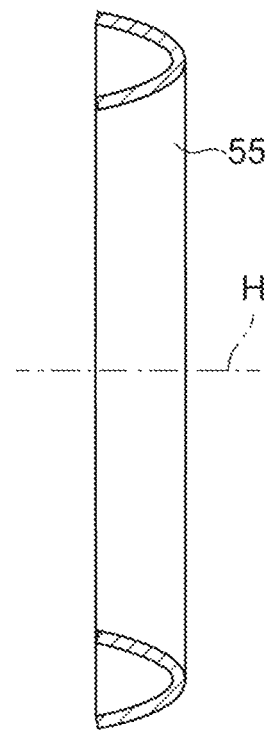
(d)
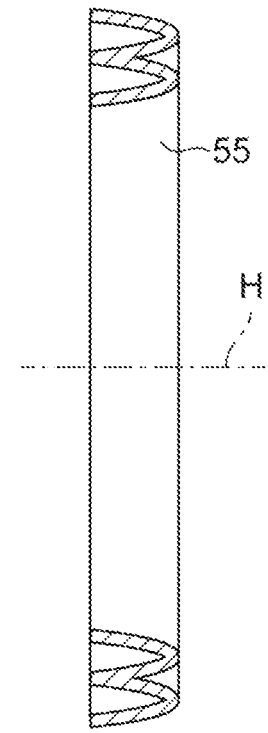

VARIABLE DISPLACEMENT SUPERCHARGER

TECHNICAL FIELD

The present disclosure relates to a variable displacement supercharger.

BACKGROUND ART

The variable displacement supercharger described in Patent Literature 1 below has been known so far. This supercharger has an annular sealing body that is fixedly fitted with a turbine housing and a rear exhaust gas introducing wall of an exhaust nozzle. A gap between the turbine housing and the rear exhaust gas introducing wall is sealed by this sealing body, and leakage from a scroll flow passage is suppressed.

CITATION LIST

Patent Literature

[Patent Literature 1] Japanese Unexamined Patent Publication No. 2010-112195

SUMMARY OF INVENTION

Technical Problem

To improve performance of this type of variable displacement supercharger, it is desirable to enhance sealability of a gap between parts by which the scroll flow passage is defined and to improve sealability of the scroll flow passage. In the supercharger of Patent Literature 1, due to an influence of circumferential temperature distribution of an exhaust gas flowing through the scroll flow passage, there is a possibility of non-uniformity occurring in a circumferential direction even in the case of temperature deformation of the sealing body and of sealing performance of the sealing body being reduced. Therefore, there is room for further improvement in the sealability of the scroll flow passage.

The present disclosure describes a variable displacement supercharger that improves sealability of a scroll flow passage of a turbine.

Solution to Problem

A variable displacement supercharger according to an aspect of the present disclosure comprises a turbine having a turbine housing configured to form a scroll flow passage disposed around a turbine impeller; a variable nozzle unit configured to include a nozzle ring that faces the scroll flow passage and forms a part of an inner wall of the scroll flow passage; and an annular seal member configured to seal a gap between the turbine housing and the nozzle ring, wherein the seal member has a disc spring structure which is inserted into the gap and biases the turbine housing and the nozzle ring in an axial direction of rotation of the turbine impeller, and is arranged further inside than the scroll flow passage in a radial direction of the turbine impeller.

Effects of Invention

According to the variable displacement supercharger of the present disclosure, sealability of a scroll flow passage of a turbine can be improved.

BRIEF DESCRIPTION OF DRAWINGS

FIG. 6 is a sectional view illustrating a modification of the seal member.

DESCRIPTION OF EMBODIMENTS

Figure 1:
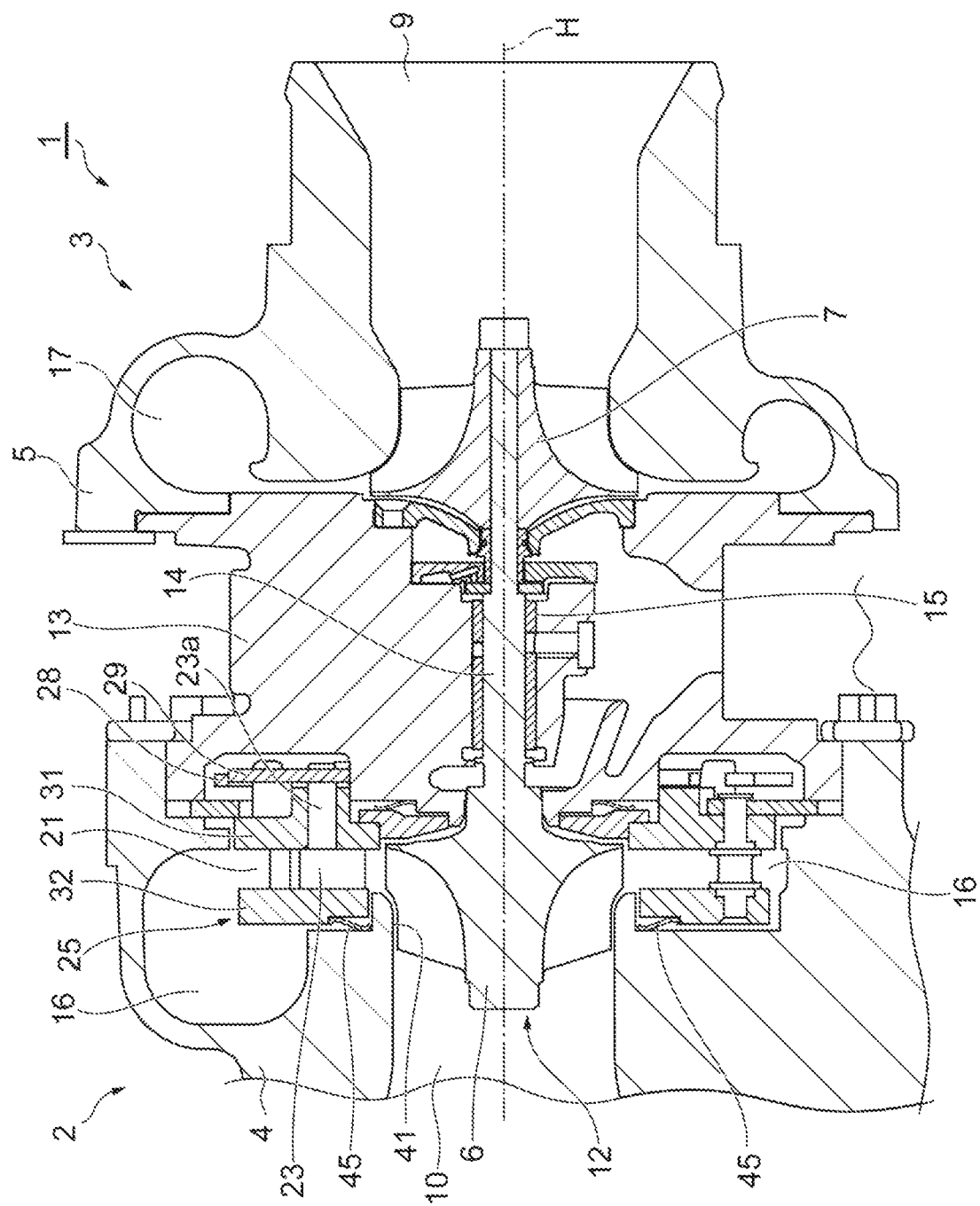
FIG. 1 is a sectional view of a variable displacement supercharger according to a first embodiment.

A variable displacement supercharger according to an aspect of the present disclosure comprises a turbine having a turbine housing configured to form a scroll flow passage disposed around a turbine impeller; a variable nozzle unit configured to include a nozzle ring that faces the scroll flow passage and forms a part of an inner wall of the scroll flow passage; and an annular seal member configured to seal a gap between the turbine housing and the nozzle ring, wherein the seal member has a disc spring structure which is inserted into the gap and biases the turbine housing and the nozzle ring in an axial direction of rotation of the turbine impeller, and is arranged further inside than the scroll flow passage in a radial direction of the turbine impeller.

A stepped part may be formed in the gap such that the gap is narrowed in the vicinity of the scroll flow passage between the scroll flow passage and a holding part that inserts the seal member in the axial direction of rotation.

At least one of opposite ends of the seal member in the axial direction of rotation may be folded back to form a curved shape.

A variable displacement supercharger according to another aspect of the present disclosure comprises a turbine having a turbine housing configured to form a scroll flow passage disposed around a turbine impeller; a variable nozzle unit configured to include a nozzle ring that faces the scroll flow passage and font's a part of an inner wall of the scroll flow passage; and an annular seal member configured to seal a gap between the turbine housing and the nozzle ring, wherein the seal member is a biasing member that is inserted into the gap and biases the turbine housing and the nozzle ring in a radial direction of rotation of the turbine impeller, and is arranged further inside than the scroll flow passage in the radial direction of the turbine impeller.

Hereinafter, embodiments of the variable displacement supercharger of the present disclosure will be described with reference to the drawings. Note that, in the drawings, features of components may be exaggerated, and the dimensional ratios between regions in the drawings do not necessarily correspond to the actual ratios.

First Embodiment

A variable displacement supercharger 1 illustrated in FIG. 1 is applied to, for instance, an internal combustion engine of a ship or a vehicle. As illustrated in FIG. 1, the variable displacement supercharger 1 is provided with a turbine 2 and a compressor 3. The turbine 2 is provided with a turbine housing 4 and a turbine impeller 6 that is housed in the turbine housing 4. The turbine housing 4 has a scroll flow passage 16 that extends in a circumferential direction around the turbine impeller 6. The compressor 3 is provided with a compressor housing 5 and a compressor impeller 7 that is housed in the compressor housing 5. The compressor housing 5 has a scroll flow passage 17 that extends in a circumferential direction around the compressor impeller 7.

The turbine impeller 6 is provided at one end of a rotary shaft 14, and the compressor impeller 7 is provided at the other end of the rotary shaft 14. A bearing housing 13 is provided between the turbine housing 4 and the compressor housing 5. The rotary shaft 14 is rotatably supported via a bearing 15 by the bearing housing 13. The rotary shaft 14, the turbine impeller 6, and the compressor impeller 7 are rotated around a rotational axis H as an integrated rotor 12.

An exhaust gas inlet (not shown) and an exhaust gas outlet 10 are provided in the turbine housing 4. An exhaust gas (a fluid) exhausted from the internal combustion engine (not shown) flows into the turbine housing 4 through the exhaust gas inlet. The exhaust gas flows into the turbine impeller 6 through the scroll flow passage 16, and rotates the turbine impeller 6. Afterward, the exhaust gas flows out of the turbine housing 4 through the exhaust gas outlet 10.

An intake port 9 and a discharge port (not shown) are provided in the compressor housing 5. When the turbine impeller 6 is rotated as described above, the compressor impeller 7 is rotated via the rotary shaft 14. The rotated compressor impeller 7 suctions outside air through the intake port 9, compresses this air, and discharges the compressed air from the discharge port through the scroll flow passage 17. The compressed air discharged from the discharge port is supplied to the aforementioned internal combustion engine.

In the following description, "an axial direction," "a radial direction," and "a circumferential direction" denote an axial direction of rotation, a radial direction of rotation, and a circumferential direction of rotation of the turbine impeller 6. In addition, "upstream" and "downstream" denote upstream and downstream in the exhaust gas in the scroll flow passage 16.

The turbine 2 will be further described with reference to FIGS. 1 to 3. The turbine 2 is a variable displacement turbine. Movable nozzle vanes 23 are provided in a gas inflow passage 21 that connects the scroll flow passage 16 and the turbine impeller 6. The plurality of nozzle vanes 23 are arranged on the circumference of a circle whose center is the rotational axis H. Each of the nozzle vanes 23 rotates around an axis parallel to the rotational axis H. The nozzle vanes 23 rotate as described above, and thereby a cross-sectional area of a gas flow passage is optimally adjusted depending on a flow rate of the exhaust gas introduced into the turbine 2.

For this reason, the turbine 2 is provided with a variable nozzle unit 25 for driving the nozzle vanes 23. The variable nozzle unit 25 is fitted inside the turbine housing 4, and is fixed between the turbine housing 4 and the bearing housing 13. The variable nozzle unit 25 has the nozzle vanes 23, a first nozzle ring 31, and a second nozzle ring (a control gap plate) 32. The first nozzle ring 31 and the second nozzle ring 32 are located across the nozzle vanes 23 in the axial direction. Each of the first nozzle ring 31 and the second nozzle ring 32 has a ring shape whose center is the rotational axis H, and is arranged to surround the turbine impeller 6 in the circumferential direction. A region sandwiched between the first nozzle ring 31 and the second nozzle ring 32 constitutes the aforementioned gas inflow passage 21. A rotating shaft 23a of each of the nozzle vanes 23 is rotatably inserted into the first nozzle ring 31. The first nozzle ring 31 journals each of the nozzle vanes 23 in a cantilever form. A step 75 extending in the circumferential direction is formed on a face of the first nozzle ring 31 which is close to the bearing housing 13. The rotating shaft 23a of each of the nozzle vanes 23 is inserted into the first nozzle ring 31 at a position further inside than the step 75 in the radial direction. The first nozzle ring 31 and the second nozzle ring 32 are coupled by a plurality of coupling pins 35 extending in the axial direction. The coupling pins 35 are made in high-precision dimensions, and thereby precise dimensions of the gas inflow passage 21 in the axial direction are secured.

The variable nozzle unit 25 has a driving force transmitter (not shown) for transmitting a driving force from the outside of the turbine 2 to the nozzle vanes 23, a driving ring 28, and a plurality of levers 29. The driving ring 28 extends on the circumference of the circle whose center is the rotational axis H. The driving ring 28 receives the driving force from the driving force transmitter (not shown), and is rotated around the rotational axis H. The levers 29 are provided in correspondence to the respective nozzle vanes 23, and are arranged on the circumference of a circle inside the driving ring 28. Grooves equal in number to the levers are formed at an inner circumference side of the driving ring 28. One end of each of the levers 29 is engaged with one of the grooves of the driving ring 28, and the other end of each of the levers 29 is fixed to the rotating shaft 23a of one of the nozzle vanes 23. When the driving force from the outside of the turbine 2 is input to the driving force transmitter 27, the driving ring 28 is rotated around the rotational axis H. Each of the levers 29 is rotated in association with the rotation of the driving ring 28, and each of the nozzle vanes 23 is rotated via the rotating shaft 23a.

Next, the arrangement of the variable nozzle unit 25 in the turbine housing 4 will be described. A shroud 41 covering the turbine impeller 6 in the circumferential direction is formed as a part of an inner circumferential surface of the turbine housing 4. The second nozzle ring 32 of the variable nozzle unit 25 is fitted at a position further outside than the shroud 41 in the radial direction. A gap G occurs between the second nozzle ring 32 and the turbine housing 4.

The second nozzle ring 32 faces the scroll flow passage 16. The second nozzle ring 32 foams a part of an inner wall of the scroll flow passage 16. That is, an inner wall surface of the scroll flow passage 16 is defined by the inner circumferential surface 42 of the turbine housing 4 and a part of an outer end face 34 of the second nozzle ring 32. A flat surface 44 perpendicular to the rotational axis H is formed between the shroud 41 and the inner circumferential surface 42 forming the inner wall surface of the scroll flow passage 16 on the inner circumferential surface of the turbine housing 4. The flat surface 44 faces the outer end face 34 of the second nozzle ring 32 with the gap G. Hereinafter, within the outer end face 34, a portion forming the inner wall surface of the scroll flow passage 16 and a portion facing the flat surface 44 may be distinguished and referred to as an outer end face 34a and an outer end face 34b.

The gap G connects the scroll flow passage 16 and a downstream part of the gas inflow passage 21. To suppress leakage of the exhaust gas from the gap G, an annular seal member 45 acting as a gasket is installed in the gap G. The seal member 45 is interposed between the outer end face 34 and the flat surface 44 in the axial direction. As illustrated in FIG. 3, the seal member 45 extends along the circumference of the circle whose center is the rotational axis H, and has a disc spring structure whose central axis is the rotational axis H. That is, the seal member 45 has a structure including a conical surface whose central axis is the rotational axis H. The seal member 45 is formed of, for instance, heat resistant stainless steel. The seal member 45 is biased in a direction in which the outer end face 34 and the flat surface 44 are moved away from each other in the axial direction due to an elastic force caused by the disc spring structure. The seal member 45 is brought into close contact with the outer end face 34 and the flat surface 44 due to the elastic force, and exerts sealability to seal the gap G.

While a dimension of the gap G in the axial direction changes depending on a temperature of the turbine 2, the seal member 45 follows the change of the dimension of the gap G due to elastic deformation caused by the disc spring structure, and maintains the sealability of the gap G. Due to a difference between a thermal expansion property of the entire variable nozzle unit 25 in the axial direction and a thermal expansion property of the turbine housing 4 in the axial direction, the dimension of the gap G in the axial direction diminishes as the temperature of the turbine 2 rises, and the dimension of the gap G in the axial direction increases as the temperature of the turbine 2 falls.

Opposite ends 45a and 45b of the seal member 45 in the axial direction are folded back to form a curved shape. With this structure, the seal member 45 avoids coming into contact with the outer end face 34 and the flat surface 44 at acute angle parts. Therefore, an area of contact between the end 45a and the outer end face 34 and an area of contact between the end 45b and the flat surface 44 are increased, and the sealability of the gap G is enhanced. According to the above structure, when the seal member 45 follows the change of the dimension of the gap G described above, the ends 45a and 45b smoothly slide on the outer end face 34 and the flat surface 44. The opposite ends 45a and 45b need not both be formed in the curved shape as described above, but either one thereof may be of the curved shape.

Figure 2:
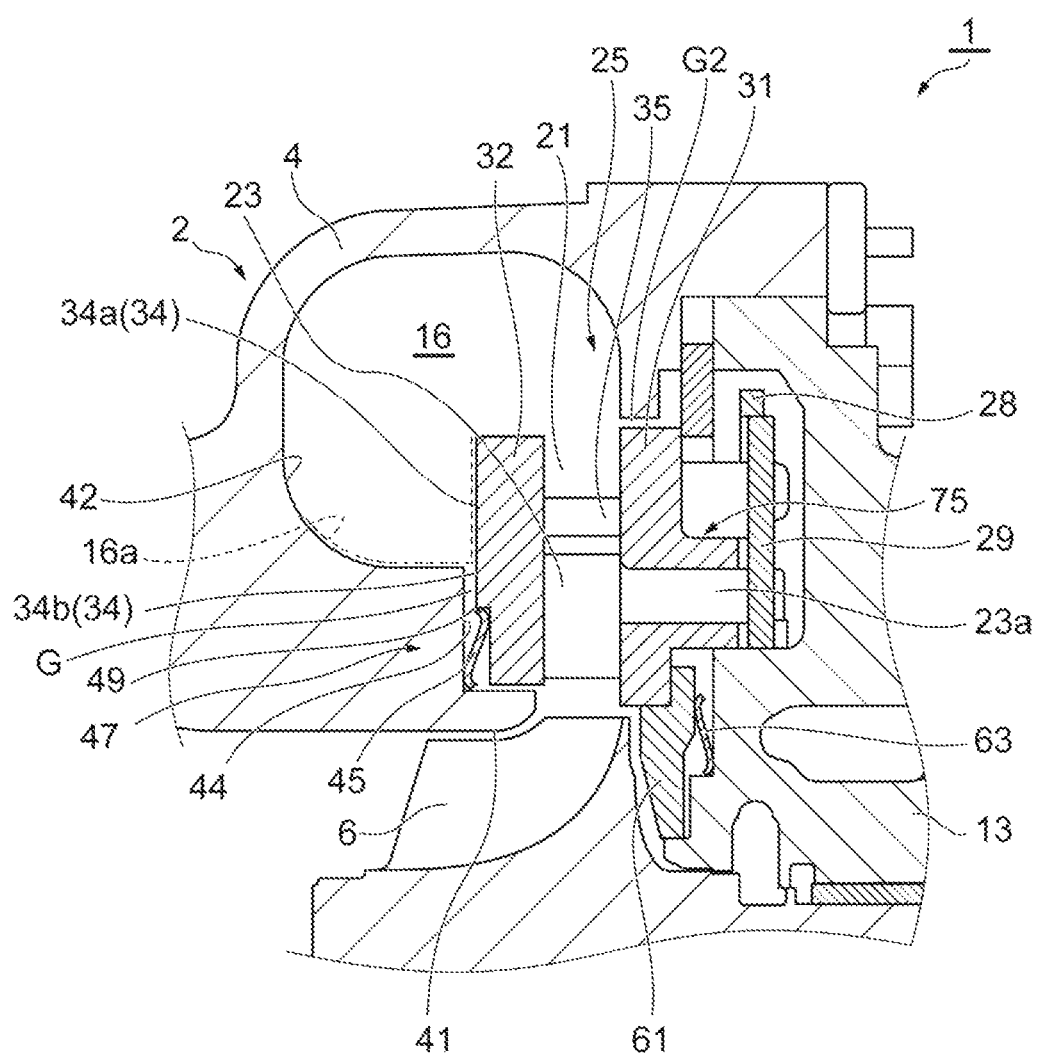
FIG. 2 is an enlarged sectional view illustrating the vicinity of a scroll flow passage in FIG. 1.
Figure 3:
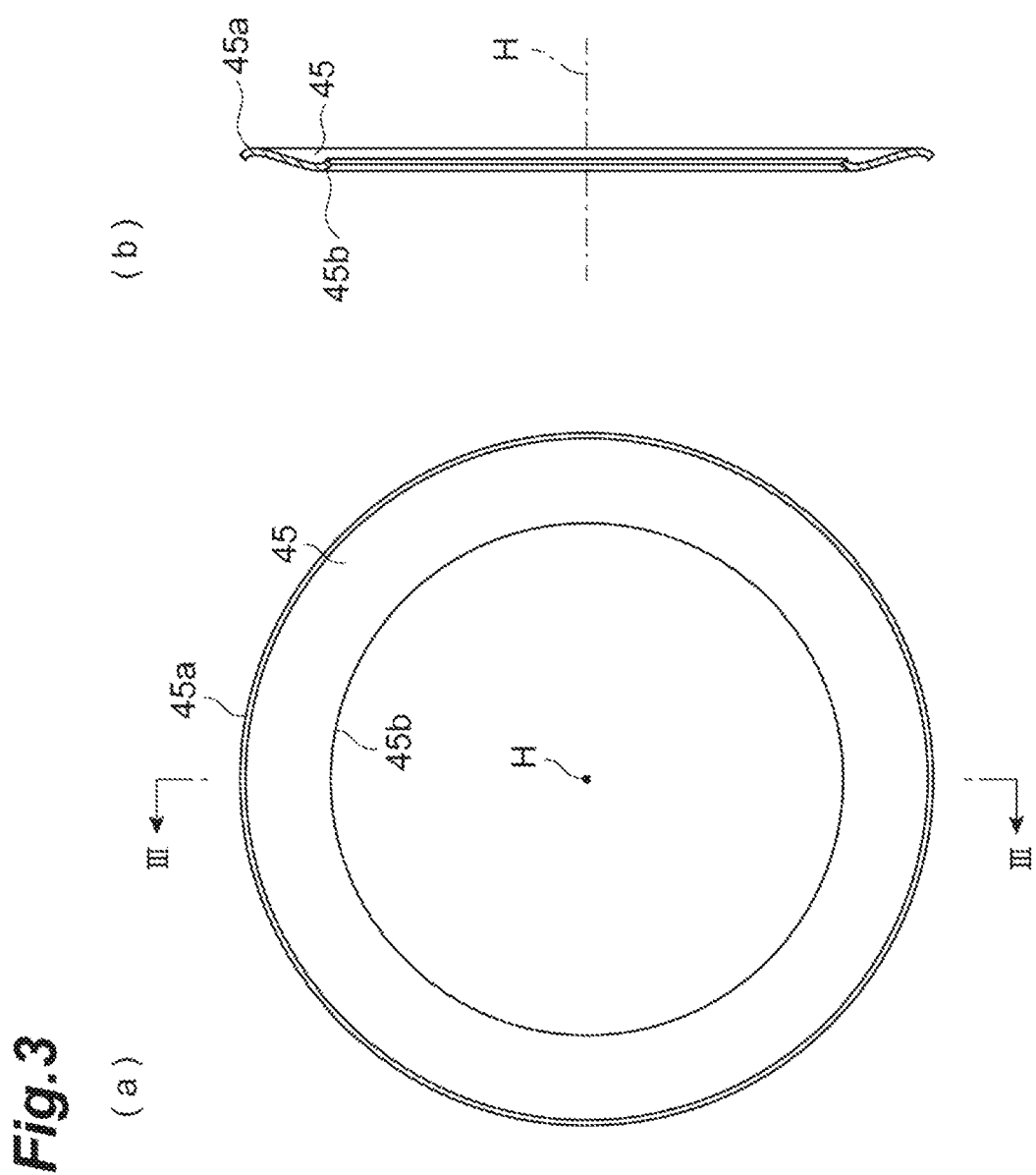
FIG. 3($a$) is a top view of a seal member, and FIG. 3($b$) is a sectional view taken along line of FIG. 3($a$).

As illustrated in FIG. 2, the seal member 45 is arranged at a position that does not protrude to the scroll flow passage 16. To be specific, the scroll flow passage 16 is a region that is partitioned by the inner circumferential surface 42 and the outer end face 34a and does not include the gap G. A part of a boundary line 16a of the region of the scroll flow passage 16 is denoted by a broken line in FIG. 2. The entire seal member 45 is located outside the scroll flow passage 16 defined as the above region. To be specific, the entire seal member 45 is arranged further inside than the scroll flow passage 16 in the radial direction. That is, the seal member 45 is interposed between the outer end face 34b and the flat surface 44, and does not protrude outward from the boundary line 16a in the radial direction. A width of the flat surface 44 is not uniform in the circumferential direction, but a positional relation in which the seal member 45 does not protrude outward from the boundary line 16a in the radial direction is established throughout the circumferential direction.

Of the gap G, a portion at which the seal member 45 is interposed is referred to as a holding part 47. A stepped part 49 is formed on the outer end face 34b between the holding part 47 and the scroll flow passage 16. Due to the presence of the stepped part 49, the gap G is narrow at a side close to the scroll flow passage 16, and is wide at a side distant from the scroll flow passage 16. When viewed from the scroll flow passage 16, the seal member 45 is held at a position that is more distant than the stepped part 49.

Next, operation and effects from the variable displacement supercharger 1 having the turbine 2 will be described. In the turbine 2, the inner wall of the scroll flow passage 16 is defined by the turbine housing 4 and the second nozzle ring 32, and the seal member 45 sealing the gap G between the turbine housing 4 and the second nozzle ring 32 is provided. The seal member 45 is arranged so as not to protrude to the scroll flow passage 16. According to this structure, the seal member 45 is not exposed to the exhaust gas flowing through the scroll flow passage 16, and is hardly relatively affected by a temperature of the exhaust gas in the scroll flow passage 16. Therefore, a circumferential temperature difference of the seal member 45 which results from temperature distribution of the exhaust gas in the circumferential direction is reduced. Thus, uneven thermal deformation that occurs at the seal member 45 in the circumferential direction is suppressed. As a result, the sealability of the seal member 45 is enhanced, and performance of the variable displacement supercharger 1 is improved. Since the disc spring structured seal member 45 can be relatively easily manufactured by pressing a ring-shaped flat plate in a thickness direction, its production cost can be suppressed. Since the seal member 45 has no region on which stress is extremely concentrated due to a characteristic of the disc spring structure, the seal member 45 is excellent in durability.

The stepped part 49 is formed in the outer end face 34b, and the seal member 45 is located at a depth side of the stepped part 49 when viewed from the scroll flow passage 16. With this structure, the gap G can be narrowed at a position closer to the scroll flow passage 16 than the stepped part 49 while an installing space of the seal member 45 at the holding part 47 is secured. Therefore, an influence of the temperature of the exhaust gas on the seal member 45 can be reduced. Since the seal member 45 has the disc spring structure, the seal member 45 follows the change of the dimension of the gap G in the axial direction due to elastic deformation, and the sealability of the gap G is maintained.

In consideration of the exhaust gas that leaks from a gap G2 between an outer edge of the first nozzle ring 31 in the radial direction and the turbine housing 4 in a direction opposite to a direction in which the first nozzle ring 31 faces the nozzle vanes 23, a structure in which a seal member 63 is provided between a heat shielding plate 61 and the bearing housing 13 may be formed. This seal member 63 may be formed to have the same disc spring structure as the seal member 45. With this structure, the sealability of the exhaust gas can be synergistically enhanced. The heat shielding plate 61 is located inside the first nozzle ring 31 in the radial direction, and is arranged between the turbine impeller 6 and the bearing housing 13.

Second Embodiment

A variable displacement supercharger 101 according to a second embodiment of the present disclosure will be described. In the description of the present embodiment, components identical or equivalent to those of the first embodiment are given the same reference signs in the drawings, and duplicate description thereof will be omitted.

Figure 4:
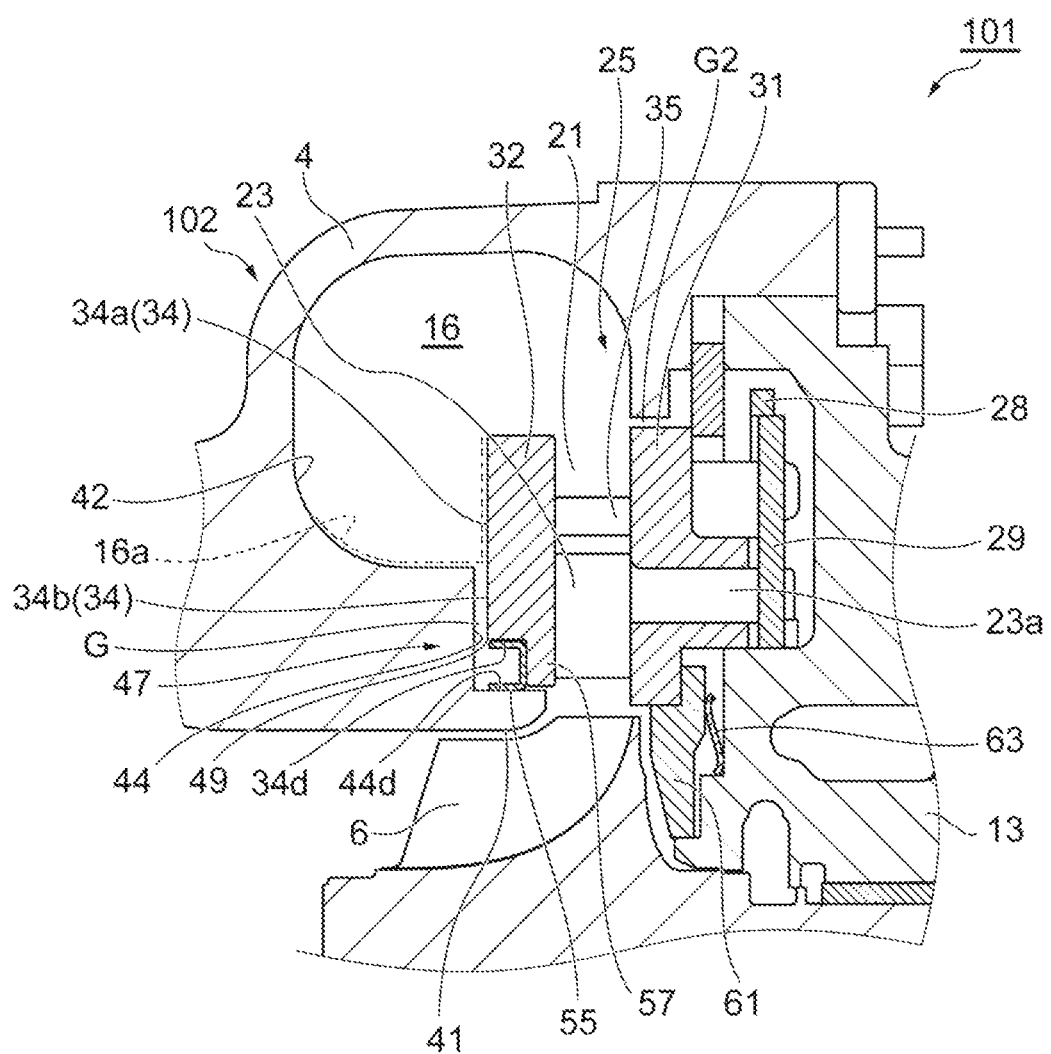
FIG. 4 is an enlarged sectional view illustrating the vicinity of a scroll flow passage of a variable displacement supercharger according to a second embodiment.
Figure 5:
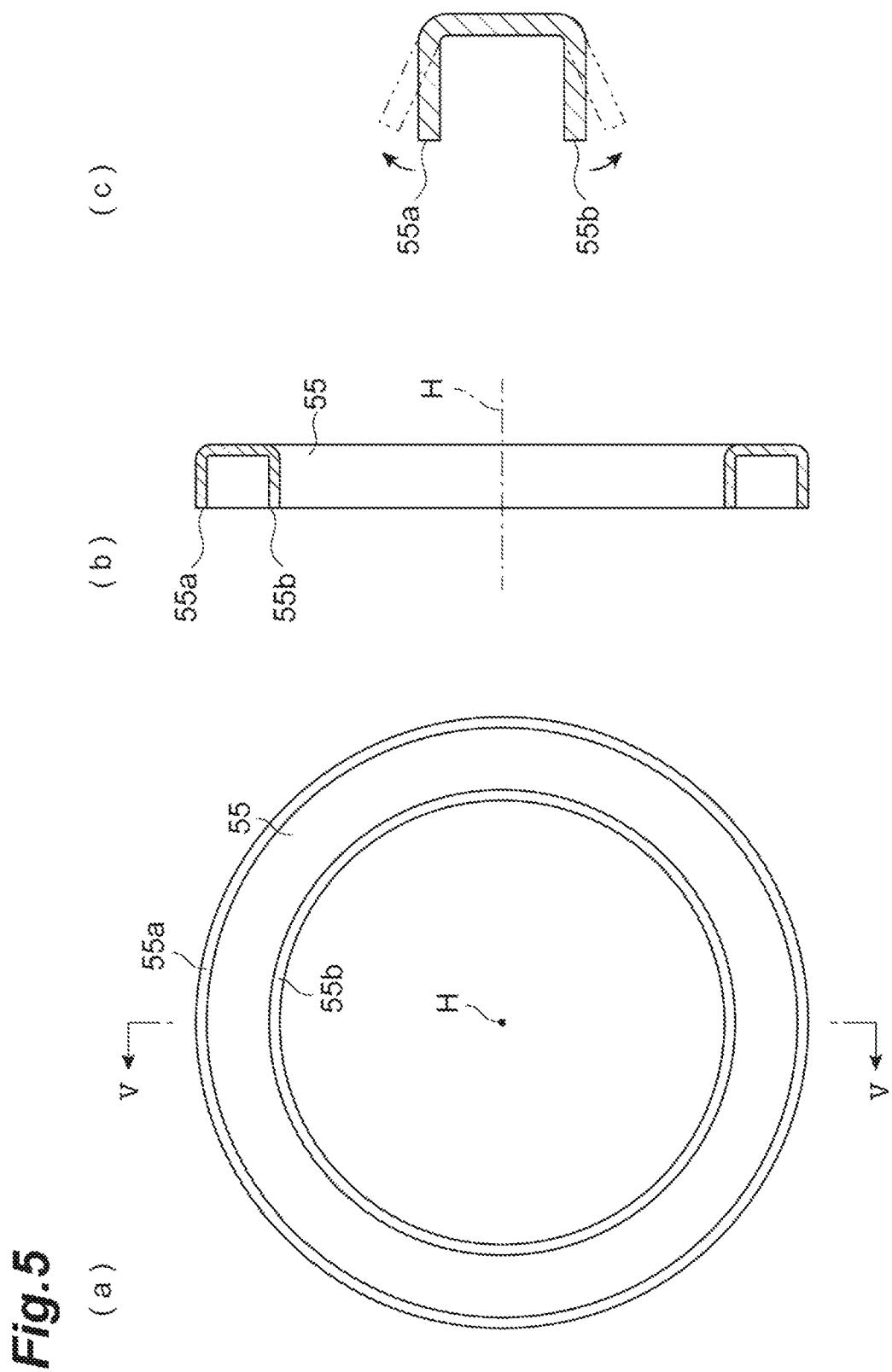
FIG. 5($a$) is a top view of a seal member, FIG. 5($b$) is a sectional view taken along line V-V of FIG. 5($a$), and FIG. 5($c$) is a sectional view illustrating elastic deformation of the seal member.

As illustrated in FIG. 4, the variable displacement supercharger 101 is different from the variable displacement supercharger 1 of the first embodiment in that the aforementioned seal member 45 is replaced with a seal member 55. As also illustrated in FIG. 5, a cross section of the seal member 55 has a C shape that has an axis of line symmetry in an axial direction and opens to a flat surface 44 side. The seal member 55 has an annular shape whose center is a rotational axis H, and is interposed between a cylindrical surface 34d and a cylindrical surface 44d in a radial direction. That is, the seal member 55 is in contact with a turbine housing 4 on an inner side in the radial direction. The cylindrical surface 34d is a cylindrical surface that is formed at a stepped part 49 of a second nozzle ring 32 and uses the rotational axis H as a cylindrical axis. The cylindrical surface 44d is a cylindrical surface that is formed at a rear side of a shroud 41 in the turbine housing 4 and has the rotational axis H as a cylindrical axis.

As denoted by a two-dot chain line in FIG. 5(c), the seal member 55 exerts an elastic force in directions in which an interval between opposite ends 55a and 55b thereof formed in a C-shaped cross section is increased. Therefore, when the seal member 55 is interposed between the cylindrical surface 34d and the cylindrical surface 44d under pressure, the seal member 55 functions as a biasing member that is biased in directions in which an interval between the cylindrical surface 34d and the cylindrical surface 44d is expanded in the radial direction. The seal member 55 is brought into close contact with the cylindrical surface 34d and the cylindrical surface 44d by the elastic force, and exerts sealability to seal a gap G.

While a dimension of the gap G in the radial direction (a distance between the cylindrical surface 34d and the cylindrical surface 44d) changes depending on a temperature of a turbine 2, the seal member 55 follows the change of the dimension of the gap G due to elastic deformation, and maintains sealability of the gap G. Due to a difference between a thermal expansion property of a second nozzle ring 32 in the radial direction and a thermal expansion property of the turbine housing 4 in the radial direction, the dimension of the gap G in the radial direction increases as the temperature of the turbine 2 rises, and the dimension of the gap G in the radial direction diminishes as the temperature of the turbine 2 falls.

In addition, a support region 57 located further inside than the stepped part 49 in the radial direction is present at the second nozzle ring 32. The seal member 55 is axially supported by the support region 57. Therefore, the seal member 55 also resists a pressure acting from a scroll flow passage 16 through the gap G.

Next, operation and effects from the variable displacement supercharger 101 having the turbine 102 will be described. In the turbine 102, an inner wall of the scroll flow passage 16 is defined by the turbine housing 4 and the second nozzle ring 32, and the seal member 55 sealing the gap G between the turbine housing 4 and the second nozzle ring 32 is provided. The seal member 55 is arranged so as not to protrude to the scroll flow passage 16. According to this structure, the seal member 55 is hardly relatively affected by a temperature of an exhaust gas in the scroll flow passage 16. Therefore, a circumferential temperature difference of the seal member 55 which results from temperature distribution of the exhaust gas in a circumferential direction is reduced. Thus, uneven thermal deformation that occurs at the seal member 45 in the circumferential direction is suppressed. As a result, the sealability of the seal member 55 is enhanced, and performance of the variable displacement supercharger 101 is improved. Since the seal member 55 having the C-shaped cross section can be relatively easily manufactured by pressing a ring-shaped flat plate in a thickness direction, a production cost is suppressed.

The stepped part 49 is formed at an outer end face 34b, and the seal member 55 is located at a depth side of the stepped part 49 when viewed from the scroll flow passage 16. With this structure, the gap G can be narrowed at a position closer to the scroll flow passage 16 than the seal member 55 while an installing space of the seal member 55 at a holding part 47 is secured. Therefore, an influence of the temperature of the exhaust gas on the seal member 55 can be reduced. Since the seal member 55 has the structure for exerting the elastic force in the radial direction, the seal member 55 follows the change of the dimension of the gap G in the radial direction due to elastic deformation, and the sealability of the gap G is maintained.

The change of the dimension of the gap G in the radial direction is easily calculated in comparison with a change in the dimension of the gap G in the axial direction. That is, in addition to a thermal expansion property of the turbine housing 4, a thermal expansion property of an entire variable nozzle unit 25 including numerous parts needs to be considered, for the calculation of the change of the dimension of the gap G in the axial direction. In contrast, for the calculation of the change of the dimension of the gap G in the radial direction, it is sufficient to consider only a thermal expansion property of the second nozzle ring 32 in addition to the thermal expansion property of the turbine housing 4. Here, since a structure in which the seal member 55 is inserted in the radial direction is adopted for the turbine 102, characteristics of the seal member 55 for following the change of the dimension of the gap G in the radial direction are relatively easily designed.

Subsequently, a modification of the variable displacement supercharger 101 will be described. As described above, to bring the seal member 55 into close contact with both of the cylindrical surface 34d and the cylindrical surface 44d, the seal member 55 needs to be pressed onto the cylindrical surface 44d of the turbine housing 4 and to be pressed onto the cylindrical surface 34d of the second nozzle ring 32 as well. Taking this assembly method into consideration, the seal member 55 may have a cross-sectional shape as in FIG. 6(a). That is, the inner end 55b in the radial direction in the cross section of the seal member 55 may be bent outward in the radial direction. According to this configuration, when the seal member 55 is pressed onto the cylindrical surface 44d of the turbine housing 4, the end 55b of the seal member 55 smoothly slides on the cylindrical surface 44d, and the seal member 55 is smoothly inserted.

For the same reason, the seal member 55 may have a cross-sectional shape as in FIG. 6(b). That is, the cross section of the seal member 55 in FIG. 6(b) forms an overall S-shape. That is, an inner portion 55c of the seal member 55 in the radial direction is bent to protrude to the turbine housing 4 side. An outer portion 55d of the seal member 55 is bent to protrude to the variable nozzle unit 25 side. According to this configuration, the seal member 55 is smoothly pressed onto the cylindrical surface 44d of the turbine housing 4 and the cylindrical surface 34d of the second nozzle ring.

Further, for the same reason, the seal member 55 may have a cross-sectional shape as in FIG. 6(c). That is, the cross section of the seal member 55 in FIG. 6(c) forms an overall V-shape. According to this configuration, the seal member 55 is smoothly pressed onto either the cylindrical surface 44d of the turbine housing 4 or the cylindrical surface 34d of the second nozzle ring. Regardless of the number of V letters, for example, the seal member 55 may have a cross-sectional shape as in FIG. 6(d). The seal member 55 may be formed not only integrally but also by a plurality of elements.

Although the embodiments of the present disclosure have been described above, the present invention is not limited to the above embodiments, and may be modified without departing from the scope described in each claim. Further, the configuration represented in the embodiments may be used by appropriate combination. For example, in the embodiments, the stepped part 49 at which the clearance G is narrowed closer to the scroll flow passage 16 than the holding part 47 is provided on the outer end face 34 of the second nozzle ring 32, but this stepped part may be provided on the flat surface 44 of the turbine housing 4.

Figure 7:
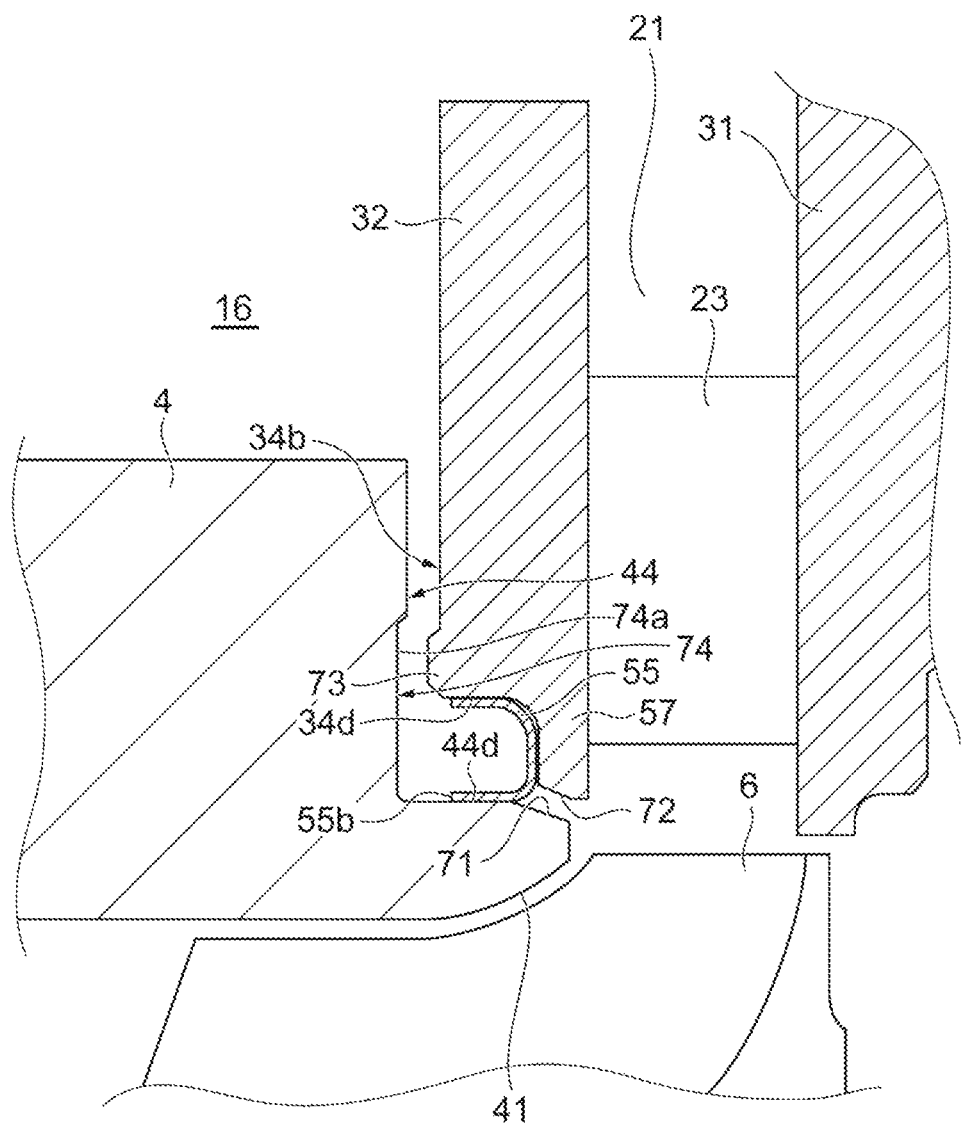
FIG. 7 is an enlarged sectional view illustrating the vicinity of a seal member of a variable displacement supercharger according to a modification.

FIG. 7 is an enlarged sectional view illustrating the vicinity of a seal member 55 of a variable displacement supercharger according to a modification. In the variable displacement supercharger of the present invention, a structure of this modification may be adopted. In the modification, components equal or equivalent to those of the first or second embodiment are given the same reference signs in the figure, and duplicate description thereof will be omitted.

As illustrated in FIG. 7, in a turbine housing 4 according to the modification, a conical surface (a diametrically reduced surface) 71 is provided to be continuous with a cylindrical surface 44d. The conical surface 71 is located close to a gas inflow passage 21 inside a seal member 55 in a radial direction, and has a shape in which a diameter thereof is reduced toward the gas inflow passage 21 side. That is, the conical surface 71 is located close to a bearing housing 13 from the cylindrical surface 44d, and is reduced in diameter toward the bearing housing 13 side. A conical inner wall surface 72 facing the conical surface 71 is provided at a part of an inner circumference of a second nozzle ring 32.

Here, operation and effects obtained by the conical surface 71 will be described. To bring the seal member 55 into close contact with both of a cylindrical surface 34d and the cylindrical surface 44d, the seal member 55 may be pressed onto both of the cylindrical surface 44d and the cylindrical surface 34d. When the seal member 55 is pressed from the bearing housing 13 side to the cylindrical surface 44d toward the turbine housing 4 side, the conical surface 71 serves as a guide, and an end 55b of the seal member 55 is smoothly guided to the cylindrical surface 44d. Therefore, the seal member 55 with an elastic force in a radial direction can be easily fitted.

Of the second nozzle ring 32, a part of an outer end face 34b facing the turbine housing 4 may be provided with a step 73 protruding to the turbine housing 4 side in order to secure an axial length enough to smoothly insert the seal member 55. A groove 74, which includes a surface facing the step 73 and is recessed to a side opposite to the second nozzle ring 32 side, may be provided in a flat surface 44 of the turbine housing 4 in order to secure a proper distance from the outer end face 34b.

As described above, the configuration illustrated in FIG. 7 may be adopted as follows. The turbine housing 4 has the flat surface (the housing flat surface) 44 that is perpendicular to the rotational axis H, the cylindrical surface (the housing cylindrical surface) 44d that is located inside the flat surface 44 in the radial direction, forms a cylindrical surface whose center is the rotational axis H, and is in contact with the inside of the seal member in the radial direction, and the conical surface (the diametrically reduced surface) 71 that is provided close to the second nozzle ring 32 from the cylindrical surface 44d, forms a conical surface whose center is the rotational axis H and is provided such that a diameter thereof is reduced in proportion to a distance from the cylindrical surface 44d. The second nozzle ring 32 has the outer end face (the nozzle ring flat surface) 34b that is perpendicular to the rotational axis H and faces the flat surface 44, the cylindrical surface (the nozzle ring cylindrical surface) 34d that is located inside the outer end face 34b in the radial direction, forms a cylindrical surface whose center is the rotational axis H, and is in contact with the inside of the seal member in the radial direction, and the conical inner wall surface (the nozzle ring conical surface) 72 that faces the conical surface 71 and forms a conical surface whose center is the rotational axis H. The step 73 protruding to the turbine housing 4 side is provided on the outer end face 34b, and the groove 74 that include the surface 74a facing the step 73 and is recessed to the side opposite to the second nozzle ring 32 side is provided.

The variable displacement supercharger may be provided with the gas inflow passage 21 which connects the scroll flow passage 16 and the turbine impeller 6 and in which the nozzle vanes 23 are provided, and the conical surface (the diametrically reduced surface) 71 which is provided in the turbine housing 4, which is located close to the gas inflow passage 21 inside the seal member 55 in the radial direction, and whose diameter is reduced toward the gas inflow passage 21 side.

REFERENCE SIGNS LIST 1, 101 Variable displacement supercharger
2 Turbine
4 Turbine housing
6 Turbine impeller
16 Scroll flow passage
25 Variable nozzle unit
32 Second nozzle ring (nozzle ring)
34b Outer end face (nozzle ring flat surface)
34d Cylindrical surface (nozzle ring cylindrical surface)
44 Flat surface (housing flat surface)
44d Cylindrical surface (housing cylindrical surface)
45, 55 Seal member
45a, 45b End
47 Holding part
49 Stepped part
71 Conical surface (diametrically reduced surface)
72 Conical inner wall surface (nozzle ring conical surface)
73 Step
74 Groove
G Gap
H Rotational axis

The invention claimed is:
1. A variable displacement supercharger, comprising:
 a turbine including
   a turbine housing configured to form a scroll flow passage disposed around a turbine impeller;
   a variable nozzle unit including a nozzle ring that faces the scroll flow passage and forms a part of an inner wall of the scroll flow passage; and
   an annular seal member configured to seal a gap between a first cylindrical surface of the turbine housing and a second cylindrical surface of the nozzle ring,
 wherein the seal member is a biasing member that is inserted into the gap and biases the turbine housing and the nozzle ring so that an interval between the first cylindrical surface and the second cylindrical surface extends in a radial direction of the turbine impeller, and
 wherein all of the seal member is arranged further inside than the scroll flow passage in the radial direction of the turbine impeller.

2. The variable displacement supercharger according to claim 1, further comprising:
- a gas inflow passage configured to connect the scroll flow passage and the turbine impeller and having nozzle vanes provided therein; and
- a diametrically reduced surface provided in the turbine housing, located further inside than the seal member in the radial direction, and reduced in diameter toward the gas inflow passage.

3. The variable displacement supercharger according to claim 1,
- wherein the first cylindrical surface and the second cylindrical surface each extend in an axial direction of the turbine.

\* \* \* \* \*